(12) United States Patent
Choi et al.

(10) Patent No.: US 9,189,863 B2
(45) Date of Patent: Nov. 17, 2015

(54) METHOD AND SYSTEM FOR DETECTING MOTION CAPABLE OF REMOVING SHADOW BY HEAT

(71) Applicants: HANWHA TECHWIN CO., LTD., Changwon-Si (KR); POSTECH ACADEMY-INDUSTRY FOUNDATION, Pohang-si (KR)

(72) Inventors: Eun-Ji Choi, Changwon (KR); Seung-In Noh, Changwon (KR); Ji-Man Kim, Pohang-si (KR); Dae-Jin Kim, Pohang-si (KR)

(73) Assignees: POSTECH ACADEMY-INDUSTRY FOUNDATION, Pohang-si (KR); Hanwha Techwin Co., Ltd., Changwon-si (KR)

( * ) Notice: Subject to any disclaimer, the term of this patent is extended or adjusted under 35 U.S.C. 154(b) by 192 days.

(21) Appl. No.: 13/887,480

(22) Filed: May 6, 2013

(65) Prior Publication Data
US 2013/0343603 A1 Dec. 26, 2013

(30) Foreign Application Priority Data

Jun. 25, 2012 (KR) .................. 10-2012-0068176

(51) Int. Cl.
*G06K 9/00* (2006.01)
*G06T 7/20* (2006.01)
*G06T 5/00* (2006.01)

(52) U.S. Cl.
CPC . *G06T 7/20* (2013.01); *G06T 5/005* (2013.01); *G06T 2207/10048* (2013.01); *G06T 2207/20081* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

| 2008/0056568 | A1* | 3/2008 | Porikli et al. | 382/173 |
| 2009/0316957 | A1* | 12/2009 | Chen et al. | 382/104 |
| 2010/0182433 | A1* | 7/2010 | Shimbo et al. | 348/153 |

FOREIGN PATENT DOCUMENTS

| JP | 2009301494 A | 12/2009 |
| KR | 20030067212 A | 8/2003 |
| KR | 1020090061405 A | 6/2009 |
| KR | 1020100012992 A | 2/2010 |
| KR | 1020110035335 A | 4/2011 |

(Continued)

OTHER PUBLICATIONS

Davis et al., "Robust Detection of People in Thermal Imagery", 2004, In Proceedings of the Pattern Recognition, 17th International Conference on (ICPR'04) vol. 4-vol. 04 (ICPR '04), vol. 4. IEEE Computer Society, Washington, DC, USA, 713-716.*

(Continued)

*Primary Examiner* — Jason Heidemann
(74) *Attorney, Agent, or Firm* — Sughrue Mion, PLLC (57) ABSTRACT

A method and system for detecting a motion of a target object in a thermal image by removing a shadow by heat of the target object from the thermal image. The motion detecting system includes: a learning unit obtaining at least one of size and brightness of a shadow by heat of a reference object based on characteristics of the shadow by heat of the reference object by temperature; and a detecting unit removing a shadow region of the target object from the thermal image including the target object based on at least one of the size and the brightness of the shadow by heat of the object.

18 Claims, 8 Drawing Sheets

(56) References Cited

FOREIGN PATENT DOCUMENTS

| KR | 101066900 B1 | 9/2011 |
| KR | 1020110114096 A | 10/2011 |

OTHER PUBLICATIONS

Davis et al., "Background-Subtraction in Thermal Imagery Using Contour Saliency", 2007, Springer, International Journal of Computer Vision 71(2), 161-181.*

Guo et al,"Single-image shadow detection and removal using paired regions", 2011, In CVPR, 2033-2040.*
Finlayson, "On the removal of shadows from images," Jan. 2006, IEEE Pattern Analysis and Machine Intelligence, vol. 28, No. 1, pp. 59,68, Jan. 2006.*
Li et al., "Feature Enhancement Using Gradient Salience on Thermal Image," Dec. 1-3, 2010, Digital Image Computing: Techniques and Applications (DICTA), 2010, pp. 556-562.*
Goube et al., "Pedestrian Tracking Using Thermal Infrared Imaging,", 2006, Proc. SPIE Conf. Infrared Technology and Applications, pp. 797-808.*

\* cited by examiner

FIG. 8

METHOD AND SYSTEM FOR DETECTING MOTION CAPABLE OF REMOVING SHADOW BY HEAT

CROSS-REFERENCE TO RELATED PATENT APPLICATION

This application claims priority from Korean Patent Application No. 10-2012-0068176, filed on Jun. 25, 2012, in the Korean Intellectual Property Office, the disclosure of which is incorporated herein in its entirety by reference.

BACKGROUND

1. Field

Methods and apparatuses consistent with exemplary embodiments relate to detecting a motion of an object in a thermal image by removing a shadow by heat of the object from the thermal image.

2. Description of the Related Art

Recently, as needs for image monitoring increase throughout our society, intelligent image analysis technologies, which trace objects, automatically recognize human faces, and sense motions in images have been developed.

The image analysis technologies enable to sense a moving object from image information and analyze a motion of the object, and thus increase efficiency of security and monitoring systems.

Meanwhile, thermal observation devices sense light having a longer wavelength than visible light and display the light as an image. Thus, the thermal observation devices may determine positions and motions of humans and objects even in the dark night.

SUMMARY

One or more exemplary embodiments provide a method and system capable of increasing accuracy in detection of a motion of a target object in a thermal image by removing a shadow by heat generated due to heat of the target object which is transferred to a background of the thermal image.

One or more exemplary embodiments also provide a method and system that may learn size and brightness of a shadow by heat according to temperatures by analyzing characteristics of a shadow by heat of a reference object and senses a shadow region based on the size and brightness.

According to an aspect of an exemplary embodiment, there is provided a motion detecting system detecting a motion of a target object, the system including: a learning unit obtaining at least one of size and brightness of a shadow by heat of a reference object based on characteristics of the shadow by heat of the reference object by temperature; and a detecting unit removing a shadow region of the target object from the thermal image including the target object based on at least one of the size and the brightness of the shadow by heat of the object.

The learning unit may include: a shadow size obtaining unit estimating a size function of the shadow by heat of the reference object to obtain the size of the shadow by heat of the reference object; and a shadow brightness obtaining unit setting threshold values based on brightness values of the shadow by heat of the reference object, the threshold values being used to obtain the brightness of the shadow by heat of the reference object.

The shadow size obtaining unit may collect data regarding a size of a shadow region with respect to a bounding box surrounding the reference object when obtaining the size of the shadow by heat of the reference object.

The shadow size obtaining unit may calculate a size parameter of the shadow by heat of the reference object according to temperatures, and calculates a size function of the shadow by heat of the reference object based on the size parameter.

The learning unit may estimate a size function of the shadow by heat of the reference object with respect to a bounding box surrounding the reference object based on the characteristics of the shadow by heat of the reference object, thereby to obtain the size of the shadow by heat of the reference object.

The shadow brightness obtaining unit may set the threshold values for dividing an object region, a shadow region, and an engine region in the object region according to temperatures based on brightness value information regarding the regions when obtaining the brightness of the shadow by heat of the reference object.

The characteristics of the shadow by heat of the reference object by temperature may be set according to time in a day.

The detecting unit may designate a shadow by heat of the target object in a corresponding temperature by using temperature information about the thermal image, and disregards the designated shadow by heat from the thermal image to detect the motion of the target object.

The detecting unit may include: a candidate region designating unit extracting a size of a shadow by heat of the target object based on the size of the shadow by heat of the reference object obtained by the learning unit, and designating a region corresponding to the size of the shadow by heat of the target object as a candidate region; a shadow region designating unit designating a region of the shadow by heat of the target object in the candidate region based on the brightness of the shadow by heat of the reference object obtained by the learning unit; and a shadow removing unit removing the designated shadow region from the thermal image to detect the motion of the target object.

The candidate region designating unit may measure a size of a bounding box surrounding the target object in the thermal image, and extracts a size of the shadow by heat of the target object from a size function of the shadow by heat of the reference object obtained by the learning unit.

The candidate region designating unit may designate the region of the shadow by heat of the target object in reference to a bottom of the bounding box.

The shadow region designating unit may designate the region of the shadow by heat of the target object if the region falls within a range of a threshold value of the brightness obtained by the learning unit.

The motion detecting system may further include a database storing data regarding characteristics of the shadow by heat of the reference object according to temperatures of a thermal image including the reference object.

According to an aspect of another exemplary embodiment, there is provided a method of detecting a motion of a target object, the method including: obtaining at least one of size and brightness of a shadow by heat of a reference object based on characteristics of the shadow by heat of the reference object by temperature; and removing a shadow region of the target object from the thermal image including the target object based on the size and brightness of the shadow by heat of the object.

The obtaining at least one of the size and the brightness of the shadow by heat may include: estimating a size function of the shadow by heat of the reference object to obtain the size of the shadow by heat of the reference object; and setting threshold values based on brightness values of the shadow by heat of the reference object, the threshold values being used to obtain the brightness of the shadow by heat of the reference object.

The obtaining at least one of the size and the brightness of the shadow by heat may include collecting data regarding a size of a shadow region with respect to a bounding box surrounding the reference object when obtaining the size of the shadow by heat of the reference object, and calculating a size parameter of the shadow by heat of the reference object according to temperatures.

The obtaining at least one of the size and the brightness of the shadow by heat may include setting the threshold values for dividing an object region, a shadow region, and an engine region in the object region according to temperatures based on brightness value information regarding the regions when obtaining the brightness of the shadow by heat of the reference object.

The removing the shadow region of the target object from the thermal image may include: extracting a size of a shadow by heat of the target object based on the size of the shadow by heat of the reference object obtained in the obtaining at least one of the size and the brightness of the shadow by heat of the reference object, and designating a region corresponding to the size of the shadow by heat of the target object as a candidate region; designating a region of the shadow by heat of the target object in the candidate region based on the brightness of the shadow by heat of the reference object obtained in the obtaining at least one of the size and the brightness of the shadow by heat of the reference object; and removing the designated shadow region from the thermal image to detect the motion of the target object.

The designating the shadow region may be performed if the region falls within a range of a threshold value of the brightness obtained in the obtaining at least one of the size and the brightness of the shadow by heat of the reference object.

The characteristics of the shadow by heat of the reference object by temperature may be set according to time in a day.

BRIEF DESCRIPTION OF THE DRAWINGS

The above and other aspects will become more apparent by describing in detail exemplary embodiments thereof with reference to the attached drawings, in which.

DETAILED DESCRIPTION OF THE EXEMPLARY EMBODIMENTS

The inventive concept will now be described more fully with reference to the accompanying drawings, in which exemplary embodiments are shown. The embodiments will be described in detail such that one of ordinary skill in the art may easily work the inventive concept. It should be understood that the embodiments may vary but do not have to be mutually exclusive. For example, particular shapes, structures, and properties according to a predetermined embodiment described in this specification may be modified in other embodiments without departing from the spirit and scope of the inventive concept. In addition, positions or arrangement of individual components of each of the embodiments may also be modified without departing from the spirit and scope of the inventive concept. Accordingly, the detailed description below should not be construed as having limited meanings but construed to encompass the scope of the claims and any equivalent ranges thereto. In the drawings, like reference numerals denote like elements in various aspects.

Hereinafter, a shadow by heat, that is, a shadow generated by hear, refers to a partial area of an image generated due to a moving object whose heat is transferred to a background in an infrared light image or a thermography image. In general, in order to improve detection performance in a moving object detecting technology, a technology of removing a shadow generated by a moving object, that is, by light has been used. However, a related art technology of removing a shadow is used in a color image but not in an infrared light image or a thermography image. A shadow by light is generated due to a moving object preventing light from reaching a background, and is generally dark in an image. On the contrary, a shadow by heat is generated due to a moving object whose heat is transferred to a background, and is generally bright in a thermal image.

The shadow by heat is brighter than a background and becomes faint as it gets far away from a moving object starting from left, right, and lower areas of the moving object. Also, the shadow by heat is generated near left, right, and lower boundaries of the moving object.

Also, hereinafter, a thermal image refers to either of an infrared image and a thermography image. The thermal image has a longer wavelength than visible light. From the thermal image, wavelength information, i.e., temperature information, of a photographed object may be obtained.

Figure 1:
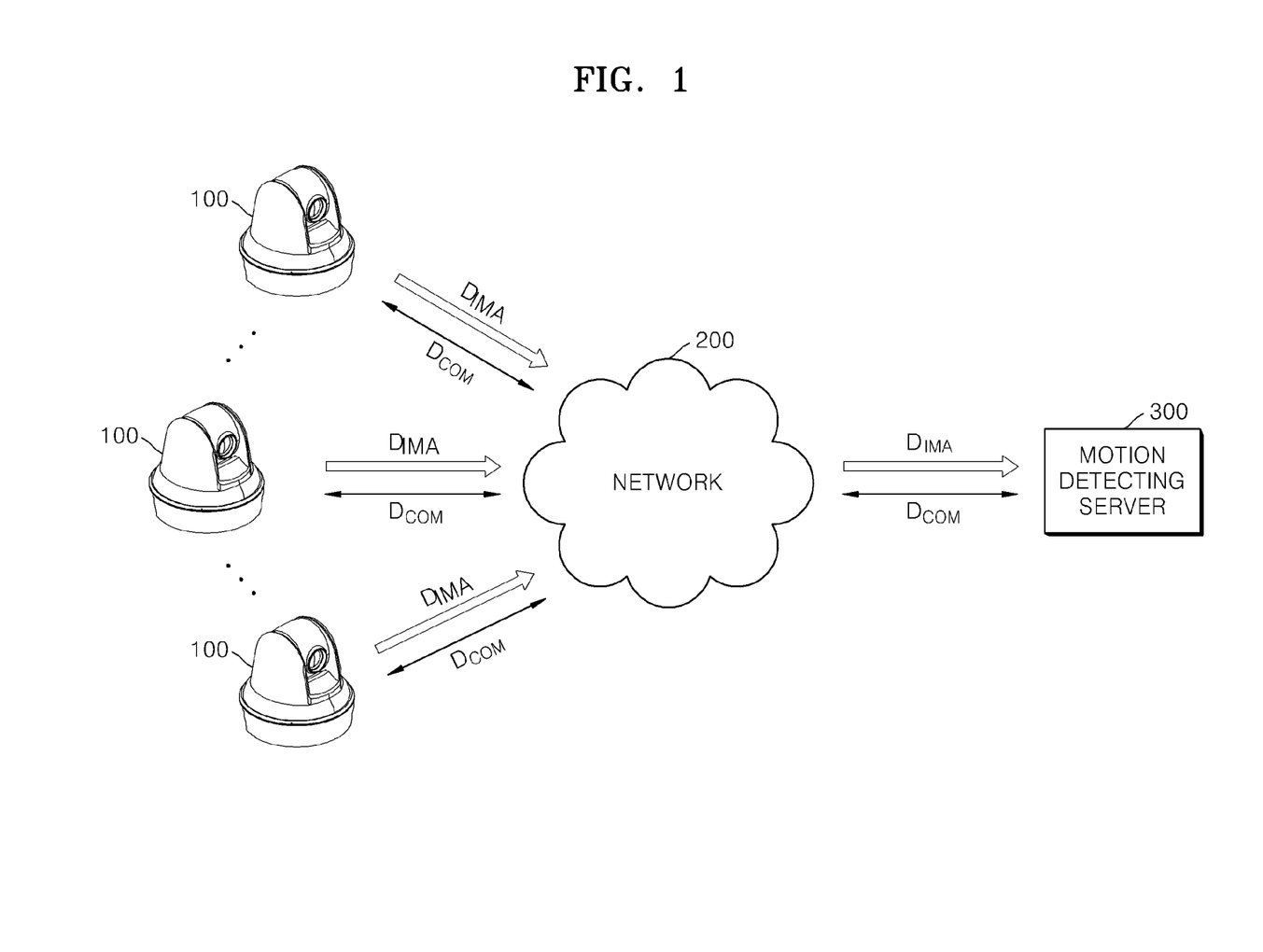
FIG. 1 is a schematic view of a system for detecting motions by removing a shadow by heat from a thermal image, according to an exemplary embodiment.

FIG. 1 is a schematic view of a system for detecting motions by removing a shadow by heat from a thermal image, according to an exemplary embodiment.

Referring to FIG. 1, a plurality of thermal image cameras 100 exchange data with a motion detecting server 300 via a network 200. In detail, the thermal image cameras 100 transmit live view image data to the motion detecting server 300 via an image data channel $D_{IMA}$ while communicating with the motion detecting server 300 via a communication channel $D_{COM}$. Alternatively, only one thermal image camera may communicate with the motion detecting server 300, or one thermal image camera or a plurality of thermal image cameras may communicate with a plurality of the motion detecting servers 300. Here, the network 200 for forming the communication channel $D_{COM}$ and the image data channel $D_{IMA}$ may be any of devices capable of sending/receiving data or commands in a wired or wireless manner. For example, the network 200 may connect the thermal image cameras 100 and the motion detecting server 300 in a wired manner via a cable, or may connect the thermal image cameras 100 and the motion detecting server 300 in a wireless manner via a wireless local area network (WLAN).

Although the motion detecting server 300 has a similar shape to a computer in FIG. 1, the thermal image cameras 100 according to the current embodiment may not necessarily communicate only with the motion detecting server 300 shown in FIG. 1, and the thermal image cameras 100 may communicate with any device having a display screen. For example, a personal computer (PC) may be used as the motion detecting server 300. The motion detecting server 300 may store image data sent from the thermal image cameras 100 in real time, if necessary.

Figure 2:
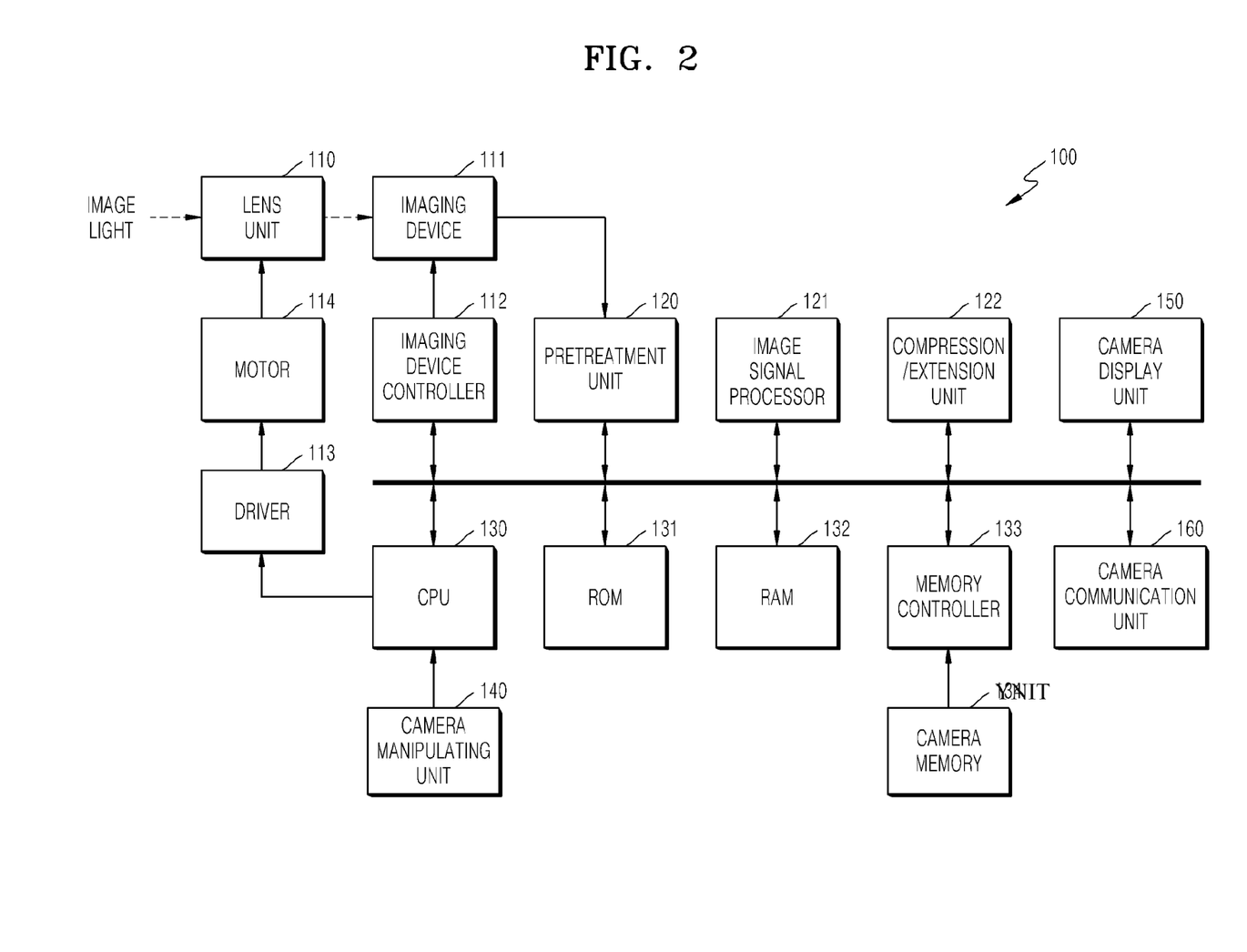
FIG. 2 is a block diagram of a thermal image camera according to an exemplary embodiment.

FIG. 2 is a block diagram of a thermal image camera 100 according to an exemplary embodiment.

Referring to FIG. 2, the thermal image camera 100 according to the current embodiment may include a lens unit 110, an imaging device 111, an imaging device controller 112, a driver 113, a motor 114, a pretreatment unit 120, an image signal processor 121, a compression/decompression unit 122, a central processing unit (CPU) 130, a read-only memory (ROM) 131, a random-access memory (RAM) 132, a memory controller 133, a camera memory 134, a camera manipulating unit 140, a camera display unit 150, a camera communication unit 160, etc.

The lens unit 110 is an optical system for focusing external light information on the imaging device 111 and transmits light from an object to the imaging device 111. The lens unit 110 includes a lens group, such as a zoom lens for changing a focal distance or a focus lens for adjusting a focus, an iris for adjusting light transmission, etc.

The zoom lens, the iris, the focus lens, etc. included in the lens unit 110 are driven by a motor 114 receiving a driving signal from the driver 113.

The imaging device 111 is a kind of a photoelectric conversion device and includes a plurality of photoelectric conversion elements capable of performing photoelectric conversion in which the imaging device 111 captures image light passing through the lens unit 110 and converts the captured image light into an electrical signal. Each of the photoelectric conversion elements generates an electrical signal according to incident light to generate an image signal. Here, the imaging device 111 captures a frame image with a predetermined period according to a timing signal applied from the imaging device controller 112 to periodically generate the image signal. The imaging device 111 may include a charge-coupled device (CCD) sensor, a complementary metal oxide semiconductor (CMOS) sensor, or the like. The imaging device 111 outputs a digital signal generated by photoelectric conversion and analog/digital (AD) conversion to the pretreatment unit 120. In the current embodiment, the imaging device 111 generates a thermal image signal in a longer wavelength band than visible light.

The imaging device controller 112 generates a timing signal and controls the imaging device 111 to capture an image in synchronization with the timing signal.

The pretreatment unit 120 generates an image signal on which image processing may be performed by processing the digital signal output from the imaging device 111. The pretreatment unit 120 outputs the image signal to the image signal processor 121. Also, the pretreatment unit 120 controls reading/writing of image data from/in the RAM 132.

The image signal processor 121 receives the image signal from the pretreatment unit 120 and generates the image signal on which image processing is performed based on a white balance (WB) control value, a γ value, an outline emphasis control value, and the like. The image signal on which image processing is performed may be applied to the compression/decompression unit 122. The image signal on which image processing is performed may also be used as a live view image, and may be transferred to the camera display unit 150 via the RAM 132.

Meanwhile, the image signal processor 121 according to the current embodiment may include the above-described motion detecting server 300. That is, although the thermal image camera 100 and the motion detecting server 300 are separated from each other in FIG. 1, components included in the motion detecting server 300 may be included in the image signal processor 121.

In other words, when a hardware unit, for example, a CPU, a digital signal processor (DSP), a RAM, or a chip for image processing is installed inside a camera, a shadow by heat may be removed from the inside of the camera, and a motion region may be detected. Besides, the image signal processor 121 may be provided in a calculating unit, such as a computer (not shown) capable of receiving an image in real time by being connected to the thermal image camera 100 via a network, to the outside of the thermal image camera 100 so that a motion may be detected by removing the shadow by heat.

The compression/decompression unit 122 receives an image signal before compression processing and compresses the image signal, for example, in a moving picture experts group (MPEG), audio video interleaved (ACI), quick time file (MOV), compression format. The compression/decompression unit 122 transmits an image file including image data generated through the compression processing to the memory controller 133. Also, the compression/decompression unit 122 may input the image file to the camera communication unit 160 and transmit the image file to a main server, i.e., the motion detecting server 300, for controlling the thermal image camera 100 via the camera communication unit 160. When the thermal image camera 100 includes the camera display unit 150, the compression/decompression unit 122 may extract the image file stored in the camera memory 134 and then perform decompression processing to be reproduced on the camera display unit 150.

The CPU 130 serves as an operation processing unit and a control unit by a program and controls processing of components installed inside the thermal image camera 100. The CPU 130 outputs a signal to the driver 113 based on, for example, focus control or exposure control to drive the motor 114. Also, the CPU 130 controls components of the thermal image camera 100 according to a signal applied from the camera manipulating unit 140. Also, in the current embodiment, although the thermal image camera 100 includes only a single CPU 130, the thermal image camera 100 may include a plurality of the CPUs 130 that perform commands from a signal system and an operating system.

The ROM 131 may store user's setting data related to photographing conditions. The ROM 131 may also store an algorithm used to control the thermal image camera 100 by the CPU 130. The ROM 131 may be an electrically erasable and programmable read only memory (EEPROM), or the like.

The RAM 132 is a device for temporarily storing various pieces of data, such as an image signal output from the pretreatment unit 120 or data generated during signal processing of the image signal processor 121. The RAM 132 may be a dynamic RAM (DRAM).

The memory controller 133 controls writing of image data in the camera memory 134 or reading of the image data written in the camera memory 134 or setting information. Examples of the camera memory 134 may include an optical disc, such as a compact disc (CD), a digital versatile disc (DVD), or a blu-ray disc, a magneto-optical disc, a magnetic disc, a semiconductor memory medium, etc. that record captured image data The image data may be included in the image file generated by the compression/decompression unit 122. The memory controller 133 and the camera memory 134 may be formed detachable from the thermal image camera 100. However, the memory controller 133 and the camera memory 134 are not necessarily installed in the thermal image camera 100. When the thermal image camera 100 is connected to the motion detecting server 300 via the network 200, a server memory 350 for storing image data may be disposed at the motion detecting server 300 for controlling the thermal image camera 100. Here, the image data may be transmitted to the motion detecting server 300 via the network 200 from the thermal image camera 100 by the camera communication unit 160.

The camera manipulating unit 140 includes, for example, various buttons or a lever installed in the thermal image camera 100 and transmits a manipulating signal to the CPU 130 by user' manipulation of the buttons or the lever. However, the camera manipulating unit 140 is not necessarily installed in the thermal image camera 100. When the thermal image camera 100 is connected via the network 200, a server manipulating unit 330 may be disposed at the motion detecting server 300 for controlling the thermal image camera 100 to control operations of the thermal image camera 100 by using a signal applied via the server manipulating unit 330.

The camera display unit 150 displays a captured image or a captured image stored in the camera memory 134, an image on which decompression processing is performed by the compression/decompression unit 122, etc. Also, the camera display unit 150 may display various setting images for controlling the thermal image camera 100.

The camera communication unit 160 transmits a live view image captured by the thermal image camera 100 or the captured image stored in the camera memory 134 to an external device, for example, the motion detecting server 300 via the network 200 in a wired or wireless manner. Also, the camera communication unit 160 receives various command signals transmitted from the motion detecting server 300 via the network 200.

Figure 3:
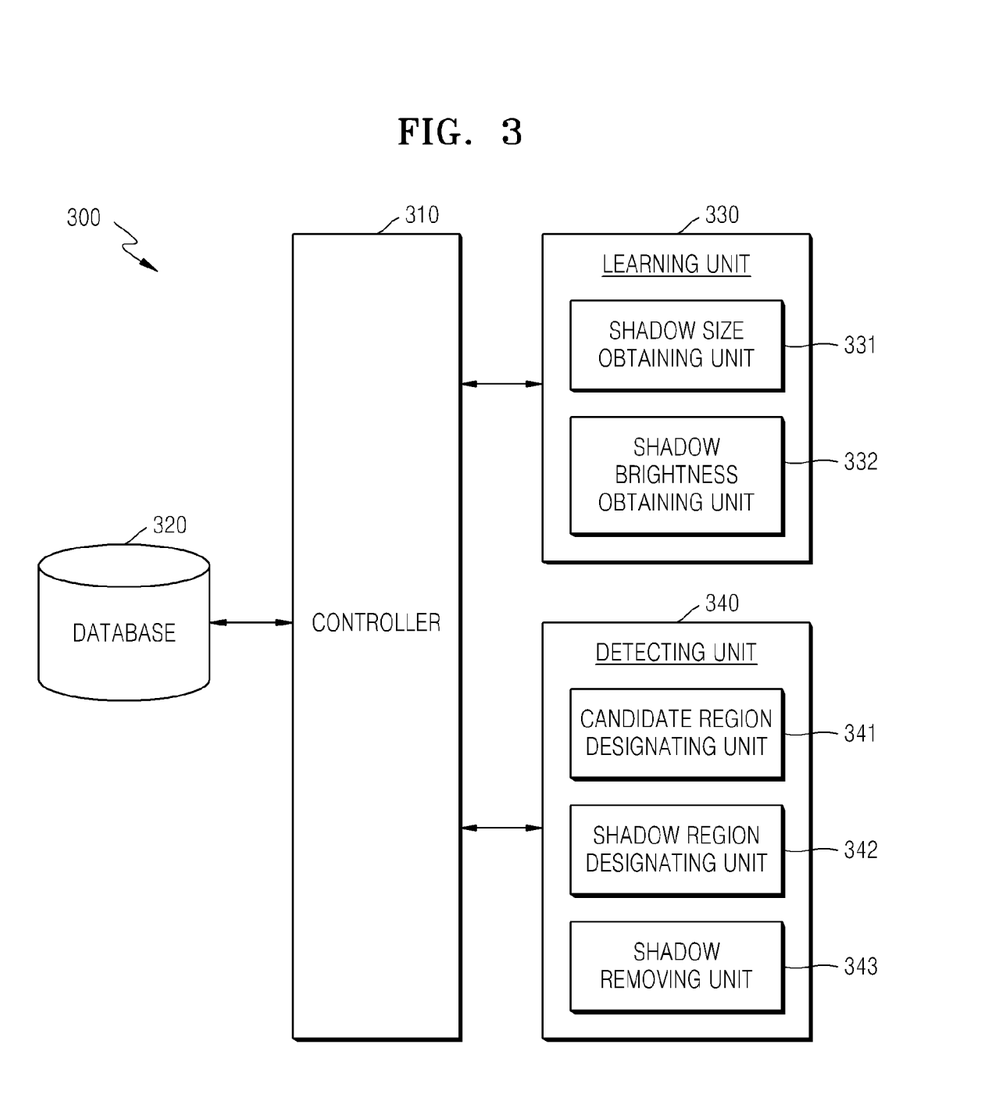
FIG. 3 is a block diagram of an internal structure of a motion detecting server according to an exemplary embodiment.

FIG. 3 is a block diagram of an internal structure of the motion detecting server 300 according to an exemplary embodiment.

Referring to FIG. 3, the motion detecting server 300 may include a controller 310, a database 320, a learning unit 330, and a detecting unit 340.

The controller 310 takes charge of communication between the database 320, the learning unit 330, and the detecting unit 340, and controls the respective components to appropriately perform their functions. Also, when the controller 310 receives a command to change a setting of the motion detecting server 300 from the outside, the controller 310 changes data of the database 320 and the learning unit 330 with reference the corresponding command.

The database 320 categorizes and stores data regarding characteristics of a shadow by heat of a reference object according to a mean temperature of a thermal image including the reference object to analyze a change in the characteristics of the shadow by heat according to a temperature. In the current embodiment, a shadow by heat of the reference object in the thermal image has a size and brightness varying according to a temperature of the thermal image. Thus, the database 320 may categorize and store characteristics of the shadow by heat of the reference object according to temperatures of a thermal image including the reference object. A reference value for storing characteristics of a shadow by heat may be directly input by a manager.

The database 320 may store the characteristics of the shadow by heat according to time in a day instead of a mean temperature. If it is difficult to measure a temperature of a thermal image to be detected, the database 320 may store characteristics of a shadow by heat according to time in a day by using a feature that a specific time period in a day has a specific temperature on average. When the database 320 stores the characteristics of the shadow by heat according to time in a day, the learning unit 330, to be described below, may obtain size and brightness information about a shadow by heat according to time in a day, and also, the detecting unit 340 may designate a real shadow by heat according to time in a day.

The learning unit 330 obtains size and brightness information about a shadow by heat according to a mean temperature based on the characteristics of the shadow by heat stored in the database 320. In other words, the learning unit 330 obtains information about a shadow by heat of a reference object according to a condition for each temperature of a thermal image so that the detecting unit 340 may detect a motion by removing a shadow by heat in real time. As shown in FIG. 3, the learning unit 330 includes a shadow size obtaining unit 331 and a shadow brightness obtaining unit 332.

The shadow size obtaining unit 331 collects data regarding a height or a size of a shadow region from a bottom of the reference object which may be a moving object such as a vehicle with respect to a size of the moving object. The shadow size obtaining unit 331 calculates a size parameter and estimates a size function of the shadow by heat.

Figure 4:
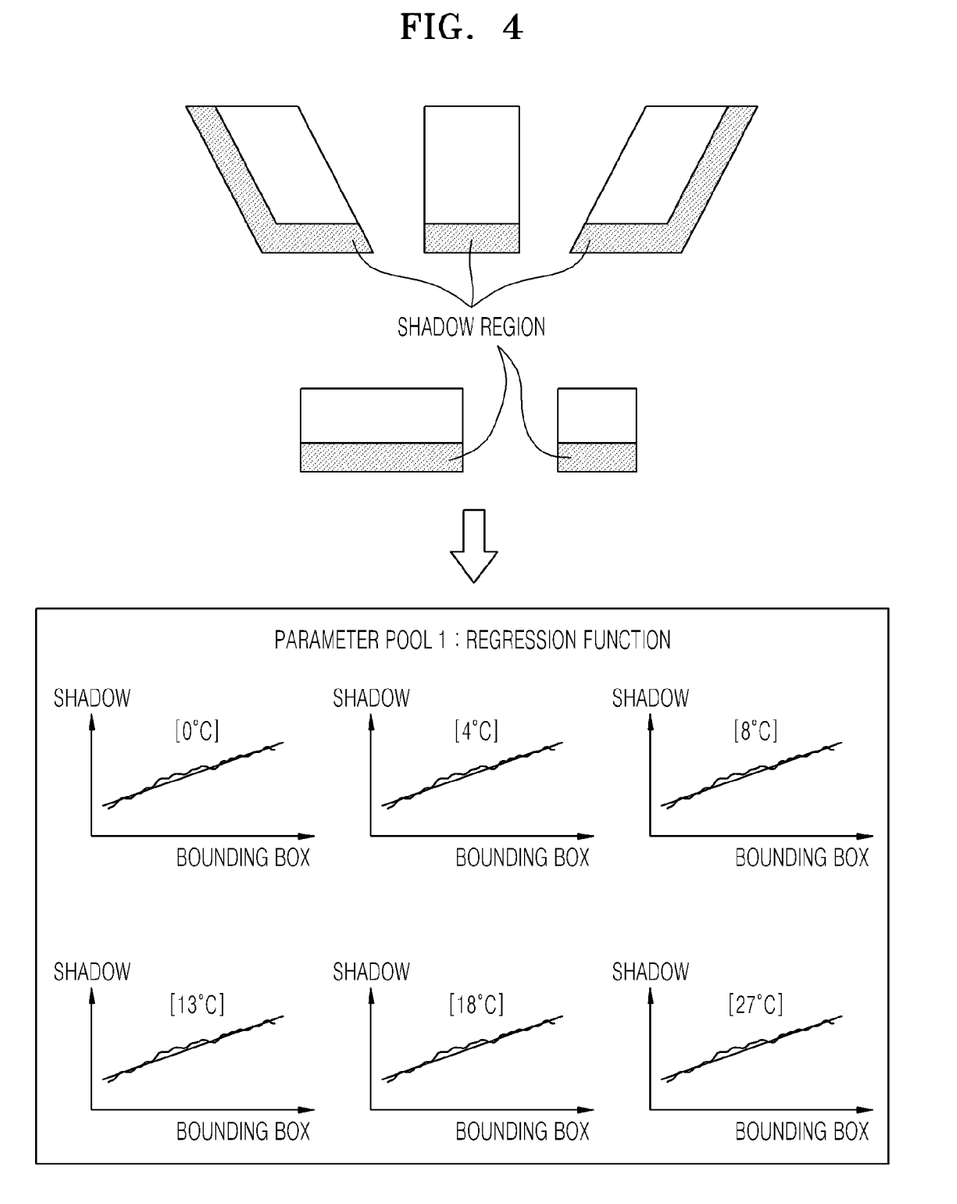
FIG. 4 is a diagram showing a case of obtaining size information about a shadow by heat based on characteristics of the shadow by heat according to an exemplary embodiment.

FIG. 4 is a diagram showing a case of obtaining size information about a shadow by heat based on characteristics of the shadow by heat according to an exemplary embodiment.

Referring to FIG. 4, first, the shadow size obtaining unit 331 receives the characteristics of the shadow by heat from the database 320 and extracts a size of a shadow region in an entire bounding box. As shown in FIG. 4, a shadow region is formed under a vehicle regardless of a moving direction of the vehicle.

The bounding box refers to an area of a motion region detected during detection of a motion in a thermal image. If a moving object moves, the shadow region moves at the same time. Thus, if the motion region is detected, the moving object and the shadow region are detected together. As such, the entire detected region is referred to as the bounding box. In other words, the bounding box, which is a motion detecting region at an early stage of removal of a shadow by heat, is an area including a real moving object and the shadow region.

The shadow size obtaining unit 331 estimates a size function of a shadow by heat with respect to a size of the bounding box of each of moving objects by using the characteristics of the shadow by heat categorized according to a mean temperature in the database 320. That is, the shadow size obtaining unit 331 obtains a size function according to temperatures using a size parameter. Here, regression analysis may be used to estimate the size function.

Graphs of FIG. 4 show the shadow size obtaining unit 331 analyzes a size of a thermal image with respect to a bounding box according to mean temperatures. In other words, according to the current embodiment, the learning unit 330 estimates a size function of a shadow by heat with respect to each of temperatures of 0° C., 4° C., 8° C., 13° C., 18° C., and 27° C. In each of the graphs of FIG. 4, a curve represents a real measured value, and a straight line represents a result of regression analysis based on the real measured value. Although, in FIG. 4, the size functions are represented as same across the different temperatures, FIG. 4 represents only an exemplary embodiment, and thus, the real size functions may differ by temperature.

For example, the shadow size obtaining unit 331 may generate a size function based on which a size of a shadow by heat "b" is produced when a size of the bounding box is "a" in the temperature of 0° C. If the size of the shadow by heat is "b", the detecting unit 340, to be described below, may determine that a region existing within the size "b" from the bottom of the extracted bounding box is a shadow region. The generated size parameter and function are used when actually detecting the shadow by heat from the thermal image.

The shadow brightness obtaining unit 332 receives the characteristics of the shadow by heat according to temperatures from the database 320, collects brightness value information about a moving object region (except an engine region), a shadow region, and the engine region of the moving object, and derives a set of threshold values for assorting the above-described regions. In other words, the shadow brightness obtaining unit 332 extracts brightness values for the moving object, the shadow by heat, and the engine region to estimate a brightness function, and sets two threshold values for dividing the above-described regions. According to the current embodiment, the moving object may be a vehicle.

Figure 5:
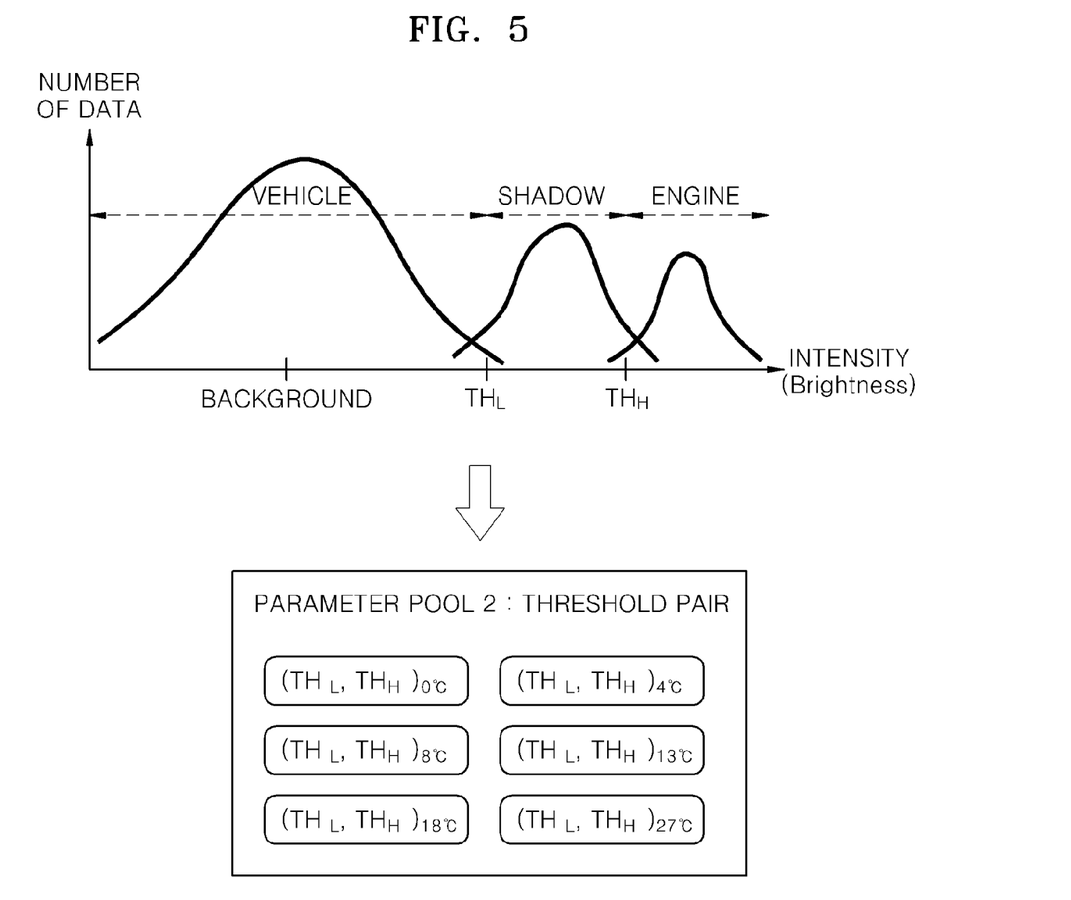
FIG. 5 is a diagram for describing a method of deriving a set of threshold values having brightness of a shadow by heat by using characteristics of the shadow by heat according to an exemplary embodiment.

FIG. 5 is a diagram for describing a method of deriving a set of threshold values having brightness of a shadow by heat by using characteristics of the shadow by heat according to an exemplary embodiment.

As shown in a graph of FIG. 5, the shadow by heat represents a higher brightness value compared to a vehicle region of a vehicle and represents a lower brightness value compared to an engine region of the vehicle. In other words, if data is aligned with respect to brightness by receiving the characteristics of the shadow by heat from the database 320, a result shown in the graph of FIG. 5 may be obtained.

The shadow brightness obtaining unit 332 obtains threshold values $TH_L$ and $TH_H$, for assorting brightness of a moving object region, a shadow region, and an engine region, according to temperatures. In other words, if extracted brightness is less than the threshold value $TH_L$, it is determined to be the moving object region, if extracted brightness is greater than $TH_L$ and less than $TH_H$, it is determined to be the shadow region, and if extracted brightness is greater than $TH_H$, it is determined to be the engine region. The shadow brightness obtaining unit 332 calculates a threshold value to designate the best boundary region for assorting distribution with respect to the three regions by using a bayesian rule. Also, the shadow brightness obtaining unit 332 may set the threshold values having a minimum error.

The shadow brightness obtaining unit 332 obtains the threshold values $TH_L$ and $TH_H$ according to a mean temperature. As described above, in a thermal image, characteristics of a shadow by heat vary according to temperatures, and thus the shadow brightness obtaining unit 332 obtains a set of threshold values according to temperatures. A lower diagram of FIG. 5 shows a set of threshold values with respect to temperatures of 0° C., 4° C., 8° C., 13° C., 18° C., and 27° C. which are obtained by the shadow brightness obtaining unit 332.

In the current embodiment, the learning unit 330 may obtain size and brightness information only when more than half the moving object is exposed in the thermal image.

The detecting unit 340 obtains temperature information regarding an image to be detected, and designates a shadow region of a target object based on the size and brightness information regarding the shadow by heat of the reference object which corresponds to the corresponding temperature.

As shown in FIG. 3, the detecting unit 340 includes a candidate region designating unit 341, a shadow region designating unit 342, and a shadow removing unit 343.

The candidate region designating unit 341 measures a size of the bounding box surrounding the target object in a thermal image to be detected, and extracts a size of the shadow by heat of the target object which corresponds to the size of the corresponding bounding box by using the size parameter and function derived by the shadow size obtaining unit 331.

In other words, the candidate region designating unit 341 obtains temperature information regarding the thermal image to be detected. Next, the candidate region designating unit 341 measures the size of the bounding box surrounding the target object detected in the thermal image. The candidate region detecting unit 340 extracts a size parameter and function of a corresponding temperature in the graph shown in FIG. 4. The candidate region detecting unit 340 may extract a size of a shadow by heat of the target object which corresponds to the corresponding bounding box by using the extracted size parameter and function.

In more detail, for example, if a measured temperature of a thermal image to be detected is 0° C. and if the size of the bounding box of the target object is "a," the candidate region designating unit 341 may obtain a size of a corresponding shadow by heat of the target object by using a corresponding size parameter and function. If the size of the shadow by heat is obtained, the candidate region designating unit 341 designates a region corresponding to a corresponding size from the bottom of the bounding box as a shadow candidate region of the target object.

Next, the shadow region designating unit 342 designates a region within a range of a threshold value as a shadow region of the target object based on brightness value information about the shadow candidate region. In other words, the shadow region designating unit 342 selects a threshold value of brightness of a shadow by heat which corresponds to a temperature of a thermal image to be detected, and designates a region within the selected threshold value as a shadow region of the target object.

In detail, for example, if a measured temperature of the thermal image to be detected is 0° C., the shadow region designating unit 342 selects $(TH_L, TH_H)_{0° C.}$ in a set of threshold values of FIG. 5 by using a corresponding threshold value. The shadow region designating unit 342 designates a region having brightness ranging from $TH_L$ and $TH_H$ in the shadow candidate region.

Next, the shadow removing unit 343 removes the designated shadow region from the bounding box. Only a purely moving object remains in the bounding box from which the shadow region is removed or disregarded.

Figure 6:
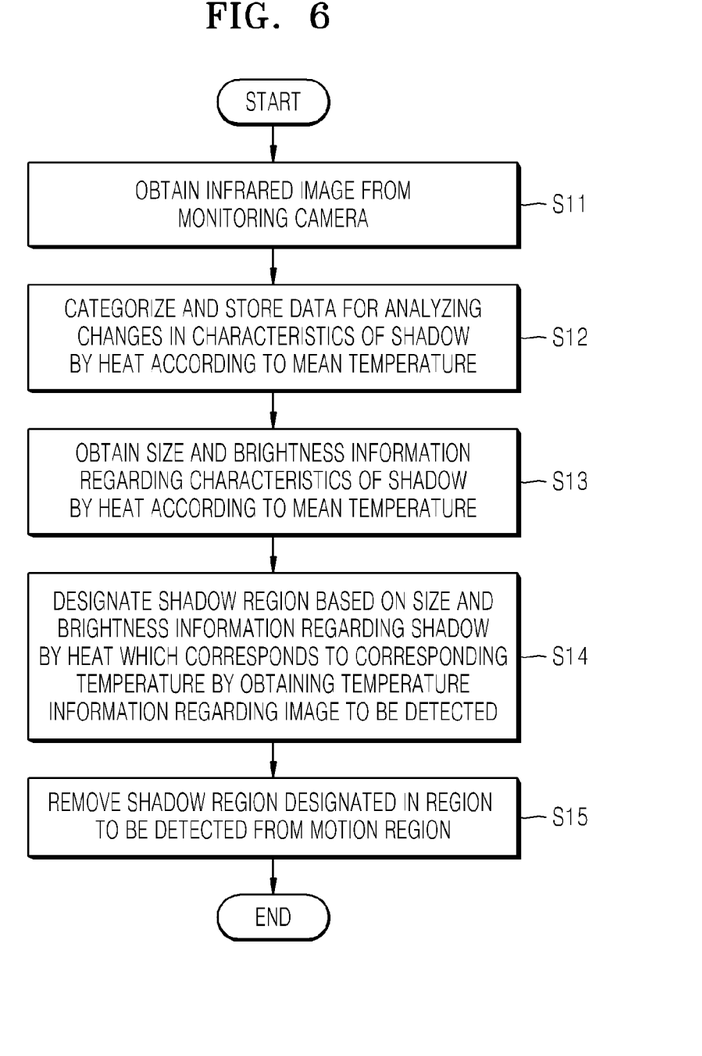
FIG. 6 is a flowchart for describing operations of a motion detecting system according to an exemplary embodiment.

FIG. 6 is a flowchart for describing operations of a motion detecting system according to an exemplary embodiment.

First, an infrared image is obtained from a monitoring camera (S11).

Next, data for analyzing changes in characteristics of a shadow by heat according to a mean temperature is categorized and stored (S12). Operation S12 may be performed prior to operation S11 according to another exemplary embodiment.

Next, size and brightness information about a shadow by heat according to the mean temperature is obtained based on the characteristics of the shadow by heat (S13).

Next, a shadow region is designated based on the size and brightness information about the shadow by heat which corresponds to a corresponding temperature by obtaining temperature information regarding an image to be detected (S14).

Finally, a shadow region designated in a region to be detected is removed or disregarded from a motion region (S15).

Figure 7:
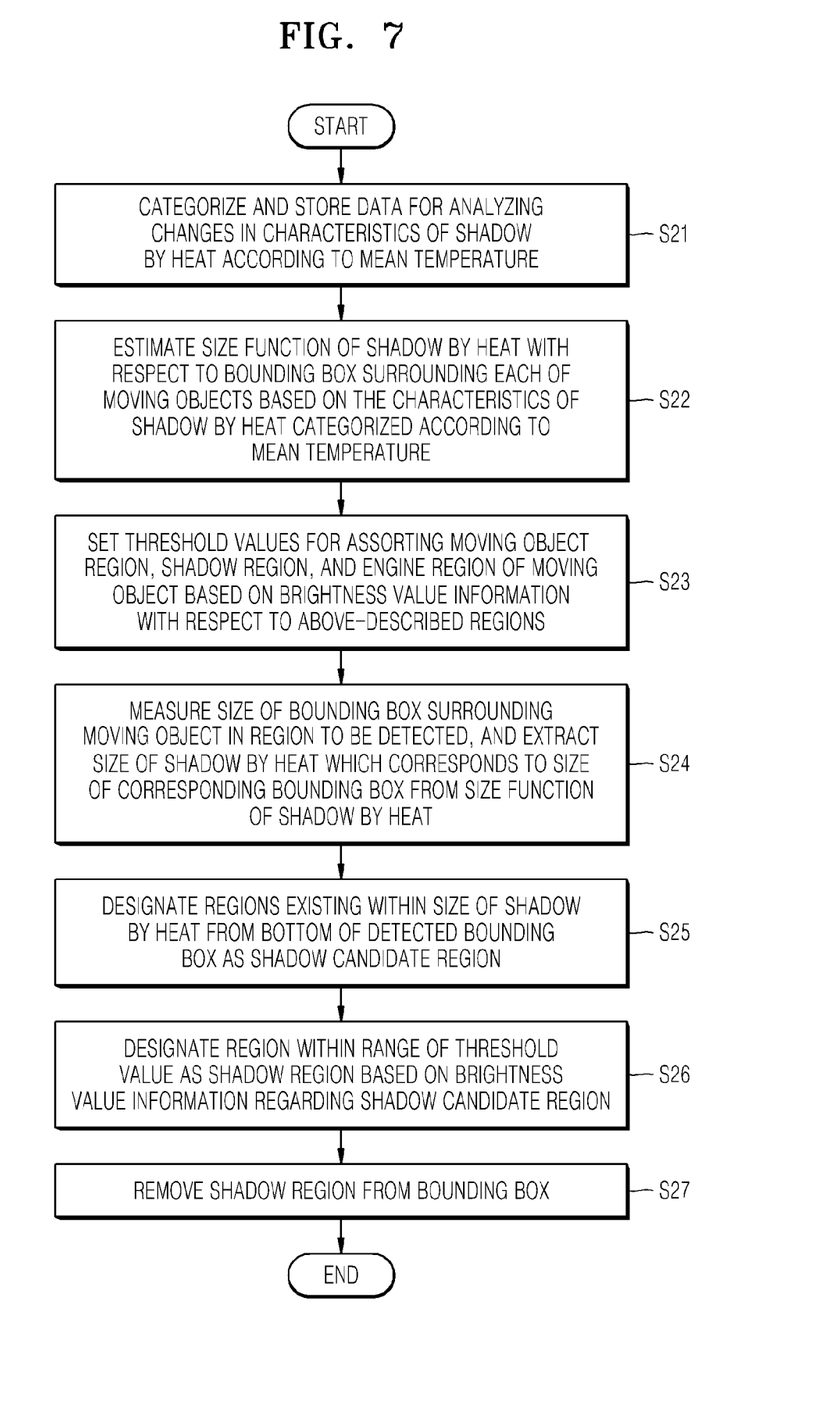
FIG. 7 is a flowchart for describing operations of a motion detecting system according to another exemplary embodiment.

FIG. 7 is a flowchart for describing operations of a motion detecting system according to another exemplary embodiment.

First, data for analyzing changes in characteristics of a shadow by heat according to a mean temperature is categorized and stored (S21).

Next, a size function of a shadow by heat with respect to a bounding box surrounding each of moving objects is estimated based on the characteristics of the shadow by heat categorized according to the mean temperature (S22).

Next, threshold values for assorting a moving object region, a shadow region, and an engine region of a moving object are set based on brightness value information with respect to the above-described regions (S23).

Next, a size of the bounding box surrounding the moving object in a region to be detected is measured, and a size of the shadow by heat which corresponds to a size of the corresponding bounding box from the size function of the shadow by heat is extracted (S24).

Next, regions existing within the size of the shadow by heat from the bottom of the detected bounding box are designated as a shadow candidate region (S25).

Next, a region within a range of the threshold value is designated as a shadow region based on the brightness value information about the shadow candidate region (S26).

Finally, the shadow region is removed or disregarded from the bounding box (S27).

Figure 8:
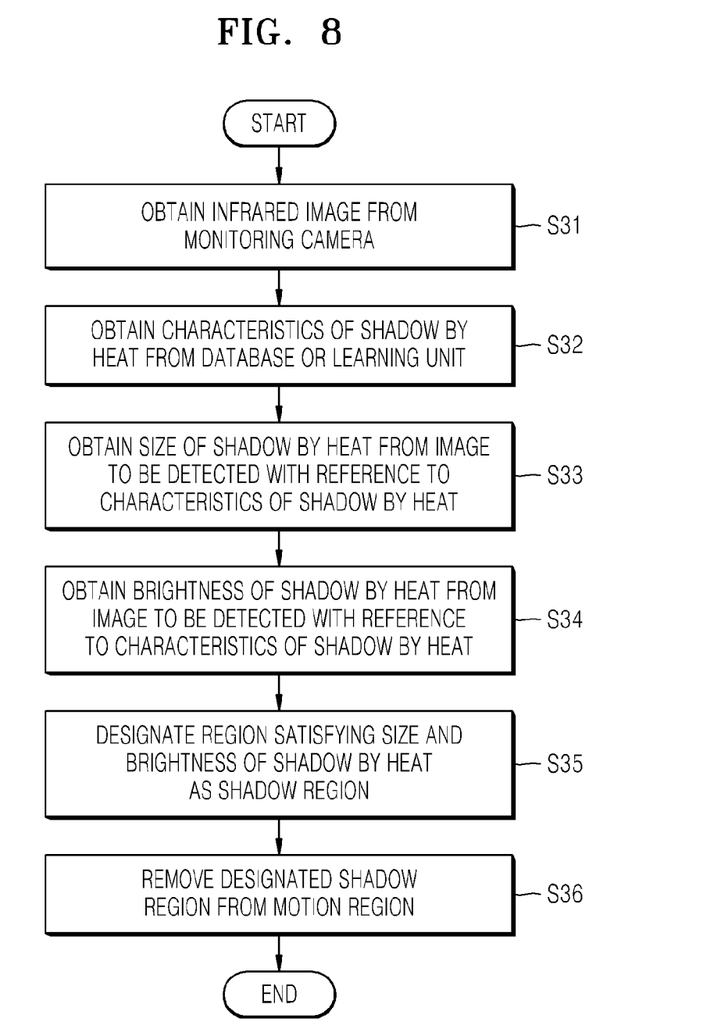
FIG. 8 is a flowchart for describing a method of removing a shadow region by a detecting unit according to another exemplary embodiment.

FIG. 8 is a flowchart for describing a method of removing a shadow region by the detecting unit 340 according to another exemplary embodiment.

The database 320 and the learning unit 330 are components that may be previously set on an off-line basis by a manager. In other words, the detecting unit 340 is a component that has to be individually used on an on-line basis for a thermal image to be detected. Data of the database 320 and the learning unit 330 may be treated as predetermined components. Accordingly, the embodiment shown in FIG. 8 shows a process of removing a shadow region from the viewpoint of the detecting unit 340.

First, an infrared image is obtained from a monitoring camera (S31).

Next, characteristics of a shadow by heat are obtained from the database 320 or the learning unit 330 (S32).

Next, a size of the shadow by heat is obtained from an image to be detected with reference to the characteristics of the shadow by heat (S33).

Next, brightness of the shadow by heat is obtained from the image to be detected with reference to the characteristics of the shadow by heat (S34).

Next, a region satisfying the size and the brightness of the shadow by heat is designated as a shadow region (S35).

Finally, the designated shadow region is removed or disregarded from a motion region (S36).

According to the one or more embodiments, accuracy of detection of a moving object may be increased by removing a shadow by heat generated due to the moving object whose heat is transferred to a background of a thermal image.

Also, a size and brightness of a shadow by heat according to temperatures may be obtained by analyzing characteristics of a shadow by heat and senses a shadow region based on the obtained information.

The particular implementations shown and described herein are illustrative examples of the inventive concept and are not intended to otherwise limit the scope of the inventive concept in any way. For the sake of brevity, general electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical".

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The exemplary embodiments are not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to those skilled in this art without departing from the spirit and scope of the inventive concept.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A motion detecting system detecting a motion of a target object in a thermal image, the system comprising:
   a learning module which is configured to obtain at least one of size and brightness of a shadow by heat of a reference object based on characteristics of the shadow by heat of the reference object by temperature and comprises:
   a shadow size obtaining module configured to estimate a size function of the shadow by heat of the reference object to obtain the size of the shadow by heat of the reference object; and
   a shadow brightness obtaining module configured to set threshold values based on brightness values of the shadow by heat of the reference object, the threshold values being used to obtain the brightness of the shadow by heat of the reference object; and
   a detecting module configured to remove a shadow region of the target object from the thermal image including the target object based on at least one of the size and the brightness of the shadow by heat of the object.

2. The motion detecting system of claim 1, wherein the shadow size obtaining module collects data regarding a size of a shadow region with respect to a bounding box surrounding the reference object when obtaining the size of the shadow by heat of the reference object.

3. The motion detecting system of claim 2, wherein the shadow size obtaining module calculates a size parameter of the shadow by heat of the reference object according to temperatures, and calculates a size function of the shadow by heat of the reference object based on the size parameter.

4. The motion detecting system of claim 1, wherein the learning module estimates a size function of the shadow by heat of the reference object with respect to a bounding box surrounding the reference object based on the characteristics of the shadow by heat of the reference object, thereby to obtain the size of the shadow by heat of the reference object.

5. The motion detecting system of claim 1, wherein the shadow brightness obtaining module sets the threshold values for dividing an object region, a shadow region, and an engine region in the object region according to temperatures based on brightness value information regarding the regions when obtaining the brightness of the shadow by heat of the reference object.

6. The motion detecting system of claim 1, wherein the characteristics of the shadow by heat of the reference object by temperature are set according to time in a day.

7. The motion detecting system of claim 1, wherein the detecting module designates a shadow by heat of the target object in a corresponding temperature by using temperature information about the thermal image, and disregards the designated shadow by heat from the thermal image to detect the motion of the target object.

8. The motion detecting system of claim 1, wherein the detecting module comprises:
a candidate region designating module extracting a size of a shadow by heat of the target object based on the size of the shadow by heat of the reference object obtained by the learning module, and designating a region corresponding to the size of the shadow by heat of the target object as a candidate region;
a shadow region designating module designating a region of the shadow by heat of the target object in the candidate region based on the brightness of the shadow by heat of the reference object obtained by the learning module; and
a shadow removing module removing the designated shadow region from the thermal image to detect the motion of the target object.

9. The motion detecting system of claim 8, wherein the candidate region designating module measures a size of a bounding box surrounding the target object in the thermal image, and extracts a size of the shadow by heat of the target object from a size function of the shadow by heat of the reference object obtained by the learning module.

10. The motion detecting system of claim 9, wherein the candidate region designating module designates the region of the shadow by heat of the target object in reference to a bottom of the bounding box.

11. The motion detecting system of claim 8, wherein the shadow region designating module designates the region of the shadow by heat of the target object if the region falls within a range of a threshold value of the brightness obtained by the learning module.

12. The motion detecting system of claim 1, further comprising a database storing data regarding characteristics of the shadow by heat of the reference object according to temperatures of a thermal image including the reference object.

13. A method of detecting a motion of a target object in a thermal image, the method comprising:
obtaining at least one of size and brightness of a shadow by heat of a reference object based on characteristics of the shadow by heat of the reference object by temperature; and
removing a shadow region of the target object from the thermal image including the target object based on the size and brightness of the shadow by heat of the object
wherein the obtaining at least one of the size and the brightness of the shadow by heat of the reference object comprises:
estimating a size function of the shadow by heat of the reference object o obtain the size of the shadow by heat of the reference object; and
setting threshold values based on brightness values of the shadow by heat of the reference object, the threshold values being used to obtain the brightness of the shadow by heat of the reference object.

14. The method of claim 13, wherein the obtaining at least one of the size and the brightness of the shadow by heat of the reference object comprises:
collecting data regarding a size of a shadow region with respect to a bounding box surrounding the reference object when obtaining the size of the shadow by heat of the reference object; and
calculating a size parameter of the shadow by heat of the reference object according to temperatures.

15. The method of 13, wherein the obtaining at least one of the size and the brightness of the shadow by heat of the reference object comprises setting the threshold values for dividing an object region, a shadow region, and an engine region in the object region according to temperatures based on brightness value information regarding the regions when obtaining the brightness of the shadow by heat of the reference object.

16. The method of claim 13, wherein the removing the shadow region of the target object from the thermal image comprises:
extracting a size of a shadow by heat of the target object based on the size of the shadow by heat of the reference object obtained in the obtaining at least one of the size and the brightness of the shadow by heat of the reference object, and designating a region corresponding to the size of the shadow by heat of the target object as a candidate region;
designating a region of the shadow by heat of the target object in the candidate region based on the brightness of the shadow by heat of the reference object obtained in the obtaining at least one of the size and the brightness of the shadow by heat of the reference object; and
removing the designated shadow region from the thermal image to detect the motion of the target object.

17. The method of claim 16, wherein the designating the shadow region of the target object is performed if the region falls within a range of a threshold value of the brightness obtained in the obtaining at least one of the size and the brightness of the shadow by heat of the reference object.

18. The method of claim 13, wherein the characteristics of the shadow by heat of the reference object by temperature are set according to time in a day.

* * * * *